United States Patent [19]

Snyder et al.

[11] Patent Number: 5,151,900
[45] Date of Patent: Sep. 29, 1992

[54] CHAOS ROUTER SYSTEM

[75] Inventors: Lawrence Snyder, Seattle, Wash.; Smaragda Konstantinidou, Los Gatos, Calif.

[73] Assignee: Washington Research Foundation, Seattle, Wash.

[21] Appl. No.: 715,828

[22] Filed: Jun. 14, 1991

[51] Int. Cl.$^5$ ............................................. H04J 3/02
[52] U.S. Cl. .................. 370/94.3; 370/85.9; 370/92; 370/91
[58] Field of Search ............. 370/94.3, 85.9, 91, 370/92

[56] References Cited

U.S. PATENT DOCUMENTS

| | | | |
|---|---|---|---|
| 4,432,996 | 11/1984 | Wilson et al. | 370/60 |
| 4,484,325 | 11/1984 | Wilson et al. | 370/60 |
| 4,543,653 | 9/1985 | Belforte et al. | 370/66 |
| 4,550,398 | 10/1985 | Belforte et al. | 370/66 |
| 4,598,400 | 7/1986 | Hillis | 370/60 |
| 4,661,947 | 4/1987 | Lea et al. | 370/60 |
| 4,742,511 | 5/1988 | Johnson | 370/85.9 |
| 4,797,882 | 1/1989 | Maxemchuk | 370/94.3 X |
| 4,814,973 | 3/1989 | Hillis | 364/200 |
| 4,814,980 | 3/1989 | Peterson et al. | 364/200 |
| 4,868,818 | 9/1989 | Madan et al. | 371/11.3 |
| 4,999,833 | 3/1991 | Lee | 370/94.3 X |

OTHER PUBLICATIONS

S. Konstantinidou and L. Snyder, "The Chaos Router: A Practical Application of Randomization in Network Routing," *Association for Computing Machinery*, 7:21-30 (Jul. 1990).

John Y. Ngai, "A Framework for Adaptive Routing in Multicomputer Networks," *California Institute of Technology*, 1-169 (1989).

*Primary Examiner*—Douglas W. Olms
*Assistant Examiner*—Russel W. Blum
*Attorney, Agent, or Firm*—Christensen, O'Connor, Johnson & Kindness

[57] ABSTRACT

A chaos router system for routing messages between connected nodes in a multicomputer or multiprocessor system is disclosed. In such a system, a message may be routed between nodes along a preferred channel so that it is closer to its destination or derouted between nodes along a random channel so that it is further from its destination. The chaos router system explicitly randomizes message selection during derouting. In an asynchronous multicomputer system, the router system keeps the overall system chaotic. In this manner, the system is probabilistically livelock free.

9 Claims, 4 Drawing Sheets

CHAOS ROUTER SYSTEM

This invention was made with government support under Contract N00014-88-K-0453 awarded by the Department of the Navy. The government has certain rights in the invention.

TECHNICAL FIELD

The present invention relates to a multicomputer message routing system and, more particularly, to a chaos router system that exploits characteristics of randomness within the system.

BACKGROUND OF THE INVENTION

A multicomputer system can generally be described as a system that includes a set of interconnected computers, i.e., processor and memory pairs. System communication and synchronization are performed by the exchange of messages between the computers. A simple example of a multicomputer system is a system including a set of serially connected computers, each of which performs a unique function. The set of functions carried out by the computers defines the overall multicomputer function. In operation, information or data in the form of a message is routed to the first computer, which performs its particular function and passes the output to the next computer. The cascading of information continues until the final output or result is produced at the last computer. In more complex systems, the information paths are not so deterministic nor are the interconnections so simple. Multicomputer systems are often adopted in order to increase the speed of processing.

A multiprocesor system is similar in theory to a multicomputer system, in that the multiprocessor system includes multiple processors and memories. The distinguishing factor is that a multiprocessor system may group the processors together, separately from the memory components. Each processor may then be connected to each memory. Thus, multicomputer and multiprocessor systems each include processors that must communicate with one another, although the processor and memory interconnections may be different. For ease of description, multicomputer systems will be referred to in this application. However, it is to be understood that the discussion, unless otherwise noted, is also applicable to multiprocessor systems.

Individual computers in multicomputer systems are often referred to as nodes. Each node is connected to one or more nodes by communication lines or channels. The nodes are connected in a variety of configurations such as hypercubes, meshes, tori, and three-dimensional cube meshes. The particular interconnection configuration defines how many channels are connected to each node. The dimension of a system determines the number of channels connected to each node. For example, in a three-dimensional bidirectional system each node may send or receive a message along six different channels. Although numerous geometric configurations exist, multicomputer configurations are physically limited by the number of wires or channels that can be connected to a particular node and interconnected in a workable system.

During normal operation, many messages may be moving through a multicomputer system. Each message includes routing information identifying its destination and possibly its source. If the source and destination nodes are not directly connected, the message must be routed through intermediate nodes. In certain multicomputer systems, each computer includes a routing subsystem to control internode routing. Each routing subsystem includes a routing controller, channel input/output components, and usually memory in the form of message buffers. The routing subsystem may be integrated into or separate from the node computers.

Figure 1:
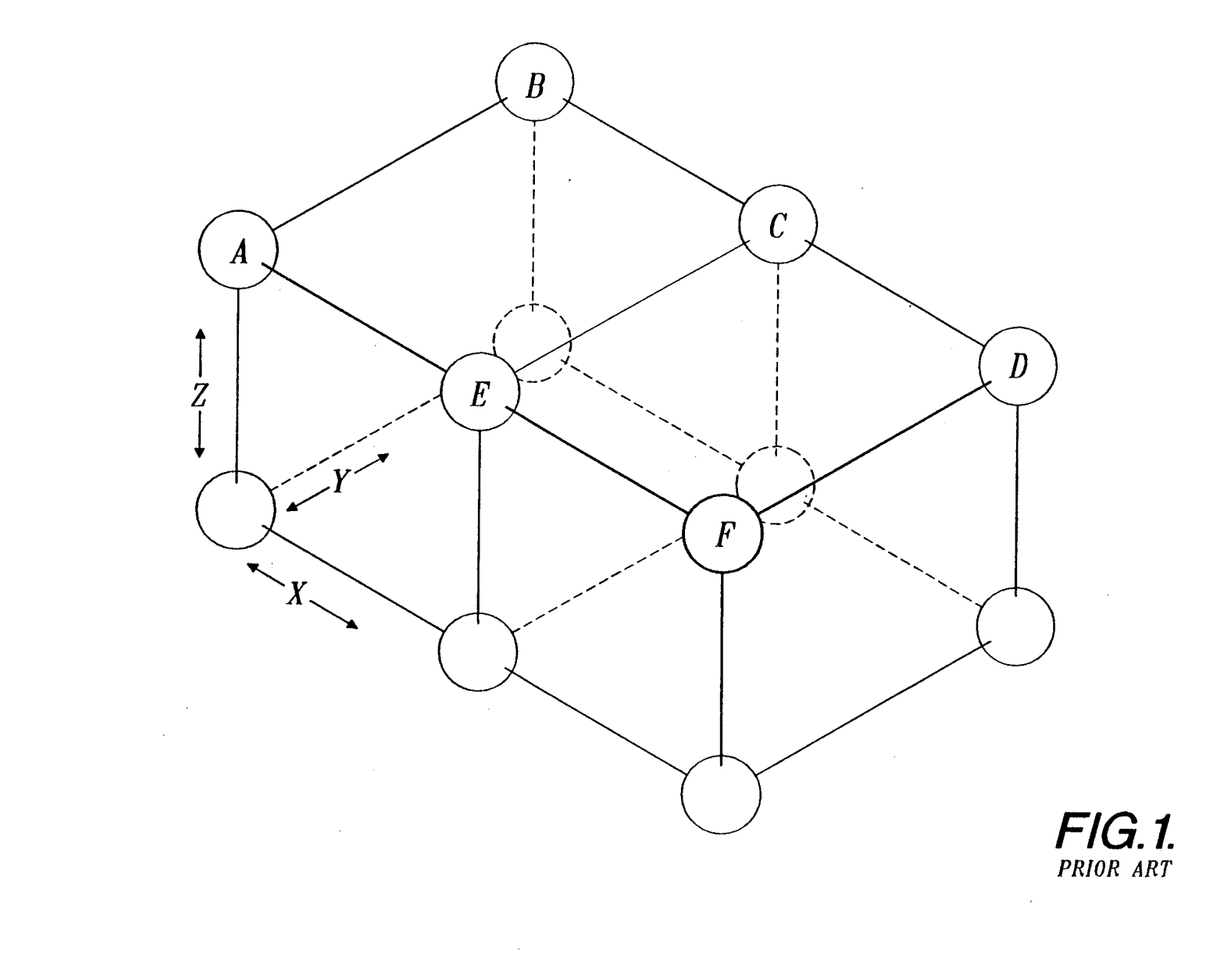
FIG. 1 is a graphic depiction of a prior art multicomputer architecture including three dimensional routing mechanisms.

A simple prior art multicomputer architecture is illustrated in FIG. 1. The system is three-dimensional, having dimensions or directions (x,y,z). If a message is to be passed from node A to node D, the message must travel two nodes in the x-direction, one node in the y-direction and zero nodes in the z-direction. Thus, the initial routing information for the message might be represented at (2,1,0). Each time the message is routed along a particular dimension, the address is updated. For example, if the message is routed from node A to node B, the y routing value is decremented by one since the message is one step closer to its destination in the y-direction. The routing address is updated at node B to (2,0,0). A few possible paths for the delivery of the message are: A-B-C-D, A-E-C-D and A-E-F-D. In some multicomputer systems routing subsystems are responsible for the message routing choices at each node.

Because the passing of messages between the nodes in a multicomputer system is so important, the determination of the message path between nodes is extremely important. There are three essential properties of routing in a successful system: the router should be free from deadlock, livelock, and starvation.

Deadlock in a multicomputer system occurs when some messages are unable to move regardless of the future (normal) activity of the system. One cause of deadlock is that one or more nodes fail and as a result all messages destined to or through the failed nodes clog up the system. In a deadlocked system, the ultimate result is that the deadlocked messages do not reach their destinations.

Livelock is a serious problem that occurs when a message continually circulates in the network and never reaches its destination. This can happen in a system wherein messages can be derouted, i.e., sent away from their destinations, in order to avoid congestion or deadlock. In the example described above, a message might be derouted so that its node path is A-B-C-E-F-D. The message was derouted when it was sent from C-E since it was routed further away from its destination. Livelock will occur if the message was continually sent along the circular path A-B-C-E-A . . . on its way to Node D. One standard solution to livelock is to time stamp every message and use the timestamp to prioritize message delivery decisions. When multiple messages are to be routed along the same dimension, the oldest message is selected and routed first. Eventually, each message ages enough to be delivered along its preferred dimension. The problems with this prioritized solution are that the process of selecting the oldest message complicates and slows the routing decision and that the timestamp portion of the message, which must be sufficiently large not to overflow, adds bits to the message Finally, starvation occurs when a node cannot inject its own messages into the system and thereby loses its ability to initiate messages. This occurs when the node's message buffer is always full because "through" messages initiated by and destined for other nodes are always filling the channels. One main goal of a message routing system related to starvation-freedom is to limit the delay before a processor can inject a message.

One prior art routing system is an oblivious router that completely determines a message's path by the message's (source node address, destination node address) pair. Such a router dispatches the messages in a manner analogous to a group of commuters who daily leave their houses and follow a predetermined fixed path to their work places. If the commuters or messages do not interfere with one another, they go directly to their destination. But since only one path is used, the commuters or messages must wait if there are commuters or messages ahead of them. Oblivious routers require only relatively simple logic in order to route messages and to guarantee deadlock freedom. (Such routers are not subject to livelock.) As a result, oblivious routers can be very fast under light to moderate random traffic. However, such routers may experience a relatively high rate of delay under heavy traffic or local congestion. These routers are fault intolerant.

Routers of another kind are randomized routers, which are meant to increase message delivery speeds over oblivious routers. One type of randomized router sends each message from its source node to a randomly selected intermediate node and from there to its destination node. The route is predetermined to meet these criteria. The practical problem with this type of router is that the length of the average message path doubles because the intermediate node is not necessarily in a direct path between the source and destination nodes. Moreover, the router penalizes average random traffic to improve routing for relatively infrequent worst case traffic.

Another alternative is an adaptive router that selects message paths based on the local load characteristics at its node. Adaptive routers can avoid local node congestion by exploiting alternative paths to a destination that can be selected locally. Such routers are more fault tolerant than oblivious routers since alternative routes avoiding nonfunctional nodes can be used. Fault tolerance is increasingly important as multicomputer systems get larger. One type of adaptive router is a minimal adaptive router, which always routes messages closer to their destinations. However, such routers do not allow derouting or misrouting, i.e., sending a message further from its destination in the presence of congestion. In nonminimal adaptive routers, derouting is allowed. Such routers may be better at handling nonuniform traffic than the minimal routers. However, although potentially fast and robust, current nonminimal adaptive routers are slowed by the standard, complex livelock protection mechanisms such as priority techniques.

The present invention solves these and other problems in the prior art using a relatively simple solution that exploits the inherent asynchrony in independent node processes coupled with a random derouting selection process. The result is a system that is deadlock free and probabilistically and operationally livelock free.

SUMMARY OF THE INVENTION

The present chaos router system provides a method and apparatus for routing messages between multiple connected nodes wherein multiple paths exist between source and destination nodes and routing decisions are made locally. A message may be routed between nodes along a preferred channel so that it moves closer to its destination or derouted between nodes along a random channel so that it moves further from its destination. A message is derouted when congestion at the local node dictates that message routing cannot continue unless a message is derouted. The chaos router explicitly randomizes message selection during derouting. Thus, unlike other nonminimal routers, the chaos router guarantees a nonzero probability that a message can avoid derouting. The systems in which the present invention is applicable are generally systems wherein the routing is local, i.e., the routing subsystems have no knowledge of the global traffic load or the local traffic load in other nodes. The invention applies to either continuous routing, whereby nodes inject messages independently of each other and without knowledge of the state of the overall system, or batched routing whereby all nodes inject simultaneously and route to completion.

The chaos router system may be integrated into a multinode processing system such as a multicomputer or multiprocessor. The multinode processing system includes a set of nodes connected by communication channels. Each node in the system includes a routing subsystem having a set of input frames for receiving messages from the channels and a set of output frames for sending messages to the channels. Each output and input frame pair correspond to a unique channel. The routing subsystem also includes a message queue for storing messages at the node. The chaos router system may also be integrated into systems with other routing subsystems.

The routing subsystem is controlled by a routing controller, which includes a random selector. During message processing, the routing controller identifies an empty output frame, selects the message from the message queue such that the channel corresponding to the empty output frame is a profitable channel for the message, and, if such a message is available, writes the message to the empty output frame. If no such message is available, the associated input frame is tested. If it is empty, the controller moves on to the next empty output frame. If a message is in the input frame, it is moved to the end of the queue, as long as there is space in the message queue. Otherwise, a message is randomly selected from the message queue and placed in the output frame. The message in the input frame is moved to the end of the message queue.

In accordance with other aspects of the present invention, each node includes a main node processor and each routing subsystem includes an injection buffer and a destination buffer. If a message read from a node's input frame is destined for that particular node, the message is written to the destination buffer where it can be retrieved by the main node processor. If the main node processor initiates a message, it is written into the injection buffer. Generally, if the injection buffer is full and the message queue is not, the message from the injection buffer is written into the message queue.

In accordance with still further aspects of the present invention, a message injection scheme is carried out by the routing subsystem to ensure that the main node processor is able to initiate messages.

In accordance with additional aspects of the present invention, the chaos router system is integrated into an asynchronous multinode processing system, wherein each node process is self-timed. In such a system, message livelock is effectively eliminated by the combination of the nodes' independent operation and the random selection of derouted messages.

The present chaos router system is an asynchronous adaptive, nonminimal router that eliminates the need for livelock protection. The router exploits randomness to keep the overall system chaotic, thereby causing repetitious routing patterns, typical of livelock messages, to decay such that the probability of a message remaining in the system longer than t seconds goes to zero as t increases. In practice, probabilistic livelock freedom can be considered to be operationally equivalent to absolute livelock freedom.

BRIEF DESCRIPTION OF THE DRAWINGS

The foregoing aspects and many of the attendant advantages of the invention will become more readily appreciated as the same becomes more readily understood by reference to the following detailed description, when taken in conjunction with the accompanying drawings, wherein.

DETAILED DESCRIPTION OF THE PREFERRED EMBODIMENT

Figure 2:
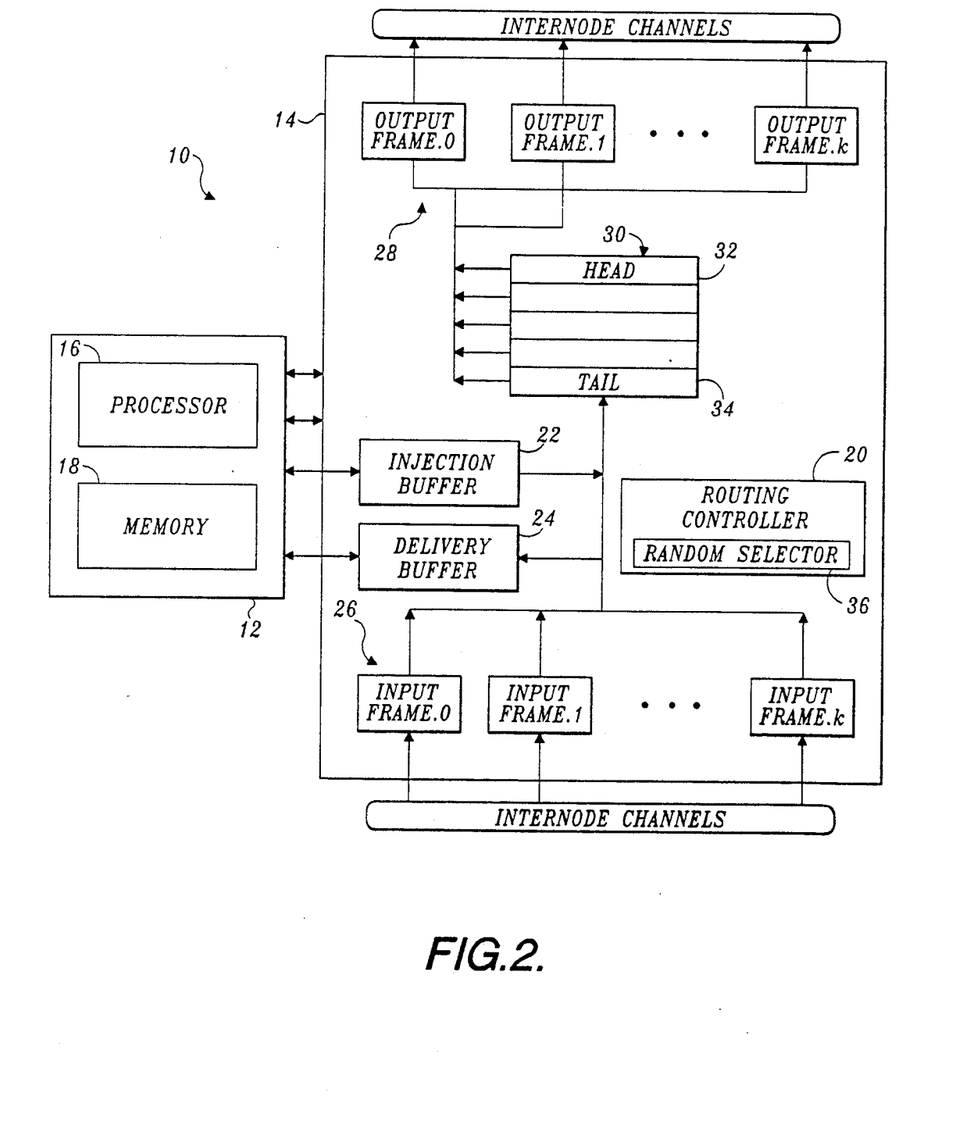
FIG. 2 is a block diagram of a multicomputer system in accordance with the present invention including a random selector within a routing controller.

With reference to FIG. 2, a node 10 in a multicomputer system is conceptually partitioned into a computer 12 and a routing subsystem 14. The multicomputer system is made up of a set of such nodes. Depending on the particular multicomputer system, the computer and routing subsystem may be integrated or may be separate components connected for communication purposes. The computer 12 consists of a processor 16 and memory component 18. The computer is the producer and consumer of the messages that are the means for communication and synchronization within the multicomputer system. The routing subsystem 14 includes a routing controller 20, and a memory component partitioned into an injection buffer 22, a delivery buffer 24, an input buffer 26, an output buffer 28, and a message queue 30.

The routing subsystem 14 communicates with its corresponding computer 12 using the injection buffer 22 and delivery buffer 24. When the computer initiates a message, the message is written into the injection buffer. The routing controller then transfers the message to the message queue 30 and subsequently to the output buffer 28. Similarly, when a message at the input buffer 26 is destined for the computer, the routing subsystem writes the message into the delivery buffer 24 so that it can be read by the computer.

In one embodiment, each node communicates with neighboring nodes via a known asynchronous channel protocol. The messages are passed between nodes along the internode channels connected via known output and input components (not shown) to the output buffers 28 and input buffers 26. Each input and output buffer includes one frame per channel, capable of holding one message each. In the illustrated example, the system has $k+1$ channels. Thus, each node is connected to $k+1$ other nodes and can send a message in any of $k+1$ directions.

The message queue 30 is a buffer having a head 32 and a tail 34. In one embodiment, the messages received from the input buffer 26 and injection buffer 22 are ordered in a first-in first-out (FIFO) manner relative to the head record. The input and output buffers, injection and delivery buffers, and the message queue are all memory components. Although illustrated in FIG. 2 as separate components, the various memory components can be integrated into a single memory subsystem. Each component is associated with an indicator, such as a binary flag, that is used to indicate whether the component is full or empty. For example, for input frame i, its indicator can be checked to determine whether the frame has a message in it.

The routing controller performs a number of functions known in the art. These functions include analysis of message address information and determination of whether a message has reached its destination and, if not, a determination of the next dimension(s) that the message can travel in order to decrease the distance between the message and its destination.

The routing controller of the present invention differs from prior systems in that the routing controller includes a random selector 36. When a message must be derouted, i.e., the message queue is full, an output channel is available, and a message must be read from the input buffer, the random selector selects a message at random from the message queue. Each message is selectable with equal probability relative to the other messages in the preferred embodiment. The selected message is derouted in that it is sent out along the available output channel, which is not a profitable channel for the message. By using such a random selection process, the chance that any message will be repeatedly derouted through the same node is negligible. Thus, the probability of livelock is essentially eliminated. Further, this type of selection replaces the cumbersome priority marking scheme described above. The random selector itself may be a random number source or pseudorandom number generator that selects a number that is used to address a message in the message queue.

In one example of an implementation of the present invention, the nodes are integrated into a multicomputer system with binary hypercube topology. It is to be understood that these routing concepts can be used with any x-ary d-cube. In a binary ($x=2$) hypercube with N nodes, the dimension $d = \log N$ and there are d channels. An example using connected nodes A and B is used throughout this discussion. It is assumed that nodes A and B are neighbors, i.e., are bidirectionally connected, in the hypercube. Further nodes A and B are neighbors along dimension i such that $0 \leq i < d$.

In general operation, if a message is initiated at node A and is destined for node B, the message is written to node A's injection buffer, to the message queue and finally to the output frame i. The message is transmitted if the input frame i of node B is empty and channel i is available in the A to B direction. When the message reaches input frame i of node B, the message remains there until node B reads from that input frame. The message is then identified as being destined for node B and is written to the destination buffer where it can be accessed by node B's computer. If a message is simply passing through node B, the message is moved from an input frame to the message queue. The message is written to an output frame when either a preferred channel is available or the message is selected by the random selector for derouting.

Generally, the beginning of internode message routing corresponds to the beginning of the multicomputer processing. Once message routing begins, each routing subsystem examines its output dimensions in a cyclical fashion independent of the operation of the other nodes. The message processing is executed as an infinite loop.

Figure 3:
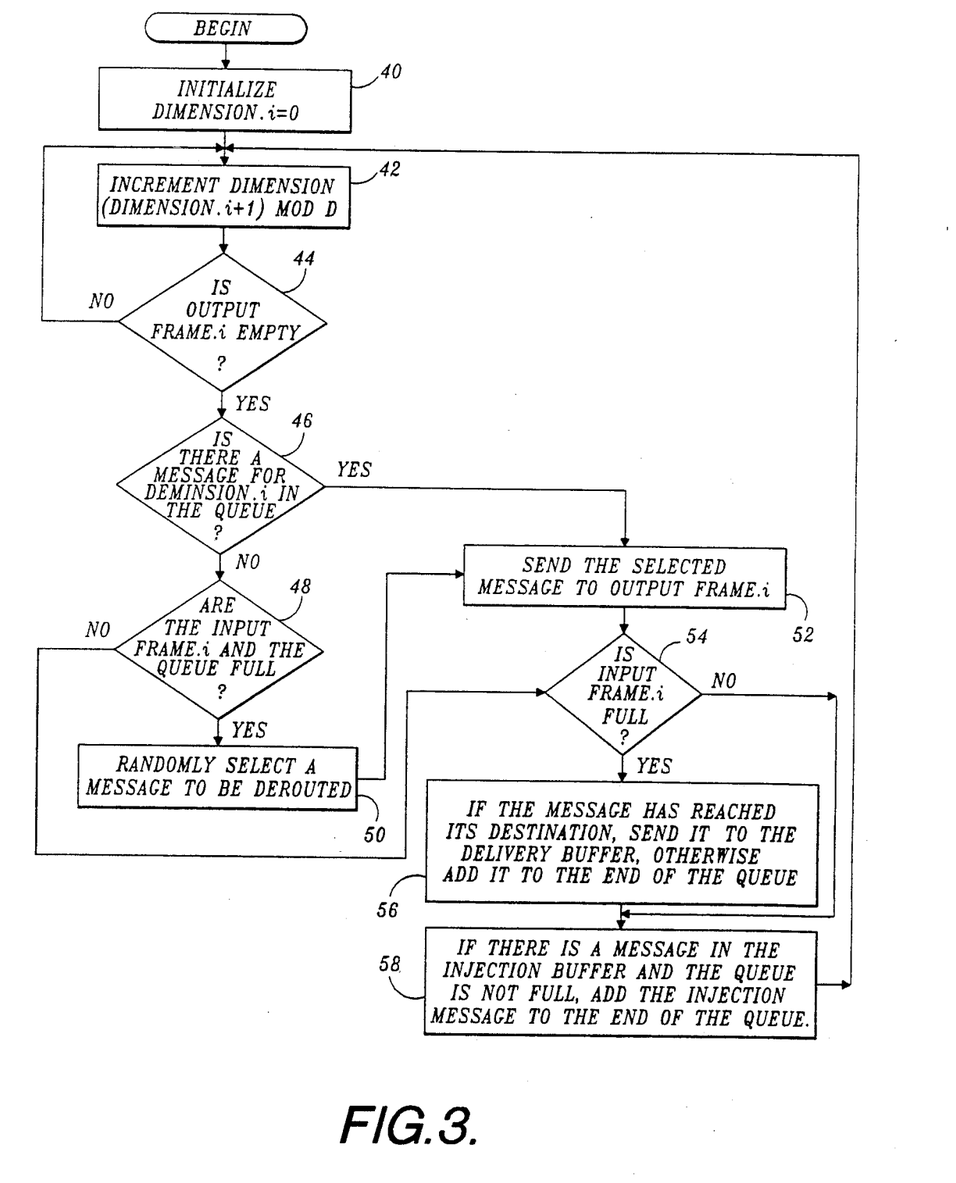
FIG. 3 is a flow diagram of a message processing loop in accordance with the present invention.

With respect to FIG. 3, the message processing loop includes the steps of considering the availability of the output frames one at a time at steps 40-44, selecting a message for routing or derouting at steps 46-50, routing the selected message at step 52 and, finally, fetching a message from an input frame or the injection buffer at steps 54-58. The method described herein is controlled by the routing subsystem.

At step 40, a dimension marker, dimension i, is initialized. In one preferred embodiment, dimension i is initialized to zero. However, the initialization can be to any nonnegative integer. At step 42, the dimension is incremented; the result is brought within the range between 0 and D-1 by using the modulo operation.

At step 44, a check is made to determine whether output frame i is empty, i.e., whether the frame is available for message routing. If the frame is not empty, dimension i is again incremented at step 42. This repeats until an empty output frame i is identified. In this manner, the routing subsystem operation keys on the availability of an output frame. To ensure continuous processing of messages through the node, whenever an output frame is considered for being assigned a message, another message, if available, is also read from an input frame. In this manner, the output and input frames are processed in pairs.

If output frame i is available, a message is sought for writing into the frame. At step 46, the messages in the message queue are examined in a first-to-last order. The first message that can be routed along dimension i is identified, if such a message exists. If no such message exists, then dimension i is not a profitable path, i.e., a path that will take a message closer to its destination, for any message in the message queue.

If, at step 48, the message queue is full and input frame i is full, a message must be removed from the message queue so that the message from input frame i can be brought into the node. Because no messages are profitably routed along dimension i, at step 50, a message is selected from the message queue for derouting along that dimension. The derouting selection is performed by the random selector 36, which randomly selects a message from the message queue. At step 52, the message identified at step 46 or the message selected for derouting at step 50 is written into output frame i. After this step, the message queue will have at least one empty space that can be filled by a message from the input buffer or the injection buffer.

At step 54, a check is made to determine whether input frame i is full. If the frame is full, at step 56, the message's routing information is examined to determine whether the message has reached its destination. If it has reached its destination, it is written into the delivery buffer. Otherwise, it is written at the end of the message queue.

At step 58, a check is made to determine whether there is a message in the injection buffer that can be added to the message queue. If there is such a message and the message queue is not full, the injection message is written into the end of the message queue. The procedure returns to step 42 to consider the next output frame. The entire process continues until the node or the multicomputer system is shut down or otherwise disabled.

One benefit of using the random selector to select a message for derouting is the fact that message processing is continuous and all available output channels are utilized. A further benefit is that by using a random selection process, the probability that a single message will be cyclically routed through a particular path is, for practical purposes, reduced to zero.

Because the chaos router system is probabilistically, rather than absolutely, livelock free, in order to ensure starvation freedom, a message injection control scheme may be implemented. Although in practice such a scheme may not be necessary, one is presented herein in order to provide a complete description of a router system that includes all of the desired router properties.

As noted above, in multicomputer systems with finite size buffers and continuous, local routing, one of the desirable properties is starvation freedom wherein every node is able to inject a message into the router system. In certain situations, a node may have a full message queue and may continuously read messages from the input buffer that have not reached their destinations. If operating in the system described above, such a node would be prevented at step 58 from injecting a message into the system. In accordance with the present invention, an injection token visits all nodes in a predetermined order giving the node holding the token the right to inject a message. The right associated with the injection token takes priority over the normal routing process.

In the present example, a hypercube with N nodes and a directed Hamiltonian cycle containing the N nodes is used. A Hamiltonian cycle is a set of transitions between the nodes N such that all nodes are visited sequentially and each node is only visited once. For each node i, $0 \leq i < N$, a neighbor(i)=j, with $0 \leq j < N$, such that (i,j) is an edge of the Hamiltonian cycle, is defined. This neighbor function is used to route the message token.

Figure 4:
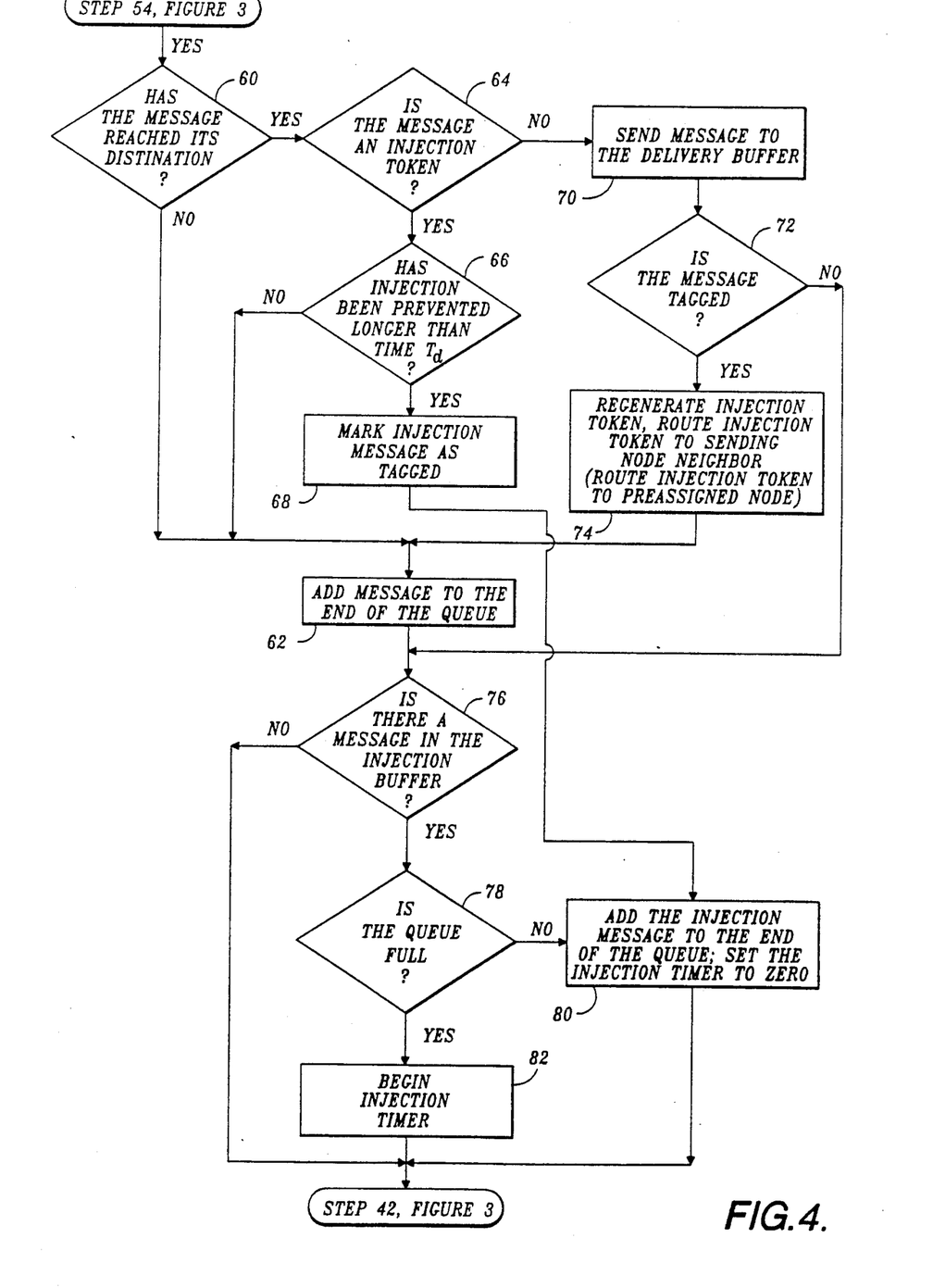
FIG. 4 is a flow diagram of a message injection control scheme in accordance with the present invention.

With reference to FIG. 4, the message injection control scheme replaces steps 56 and 58 described in conjunction with FIG. 3. Differences between a system implementing the injection control scheme and the system described in conjunction with FIG. 3 are that when the network is initialized, an injection token is sent into the system, and an injection timer is maintained at each node. An injection token is a null message identified as the injection token. At each node, steps are taken to identify an injection token; to determine whether to use the token; if the token is used, to mark the next message; and to regenerate the token when a marked message reaches its destination. One essential element of the procedure is that if the injection token is consumed, it must be regenerated at some point so that it can continue to be passed to each node in the system.

At step 60, node A reads a message from input frame i and determines whether it has reached its destination. If it has not, the message is added to the message queue at step 62 to continue its routing. If the message has reached its destination, a determination is made at step 64 of whether the message is the injection token. If it is, at step 66, the routing controller determines whether it has been prevented from message injection longer than a predetermined time $T_d$. The injection timer is used to make this determination; the timer is set at step 82, discussed below. If the timer value is less than time $T_d$, the injection token is given the next node on the Hamiltonian cycle as a destination address and written onto the message queue in the normal fashion at step 62 to continue the token's routing. The time $T_d$ is predetermined based on expected or measured system operation.

If the timer value is greater than time $T_d$, at step 68 the injection token is consumed by node A, i.e., node A uses the token's space in the message queue for an injection message. The injection message is marked as message m and is referred to as a tagged message. The message includes an identifier that other routing controllers recognize. In one embodiment, the routing controller of node A computes the address of its neighbors in the Hamiltonian cycle. For example, if neighbor-(A)=C, then node C is identified in the message information. At step 80, the tagged message is written into the message queue. In this example, assume that the tagged message is destined for node B.

Referring now to node B's processing, when the tagged message reaches node B, the node determines, at steps 60 and 64, that the message has reached its destination and is not an injection token. At step 70, the message is written to the delivery buffer. At step 72, a check is made to determine whether the message is tagged. If it is, then node B is responsible for regenerating and routing the injection token. At step 74, the injection token is regenerated and routed to node C, which is the neighbor of node A identified by the message. At step 62, the new injection token is written into the message queue. In this manner, the routing of normal messages, tagged messages and injection tokens is the same within the overall system since the differences are dealt with at each individual node.

At step 76, a check is made to determine whether there is a message in the injection buffer. If so, at step 78, a check is made to determine if the message queue is full. If the message queue is not full, at step 80 the message from the injection buffer is written into the message queue and the injection timer is set to zero. At step 82, if there is a message in the injection buffer, the message queue is full, and the injection timer is not running, the injection timer is started. In this manner, the injection timer will continue running until either a message is allowed to be injected at step 80 in the normal course or is injected at steps 62 and 66 by permission of the injection token. Using this message injection scheme, the chaos router system is guaranteed to be starvation free. The process returns to step 42 of FIG. 3 to consider the next output frame.

As noted above, the use of the random selector in the routing subsystem ensures probabilistic livelock freedom. Other system characteristics increase the independence of the nodes and thereby improve performance. As noted, the chaos router system is preferably implemented in a fully asynchronous system. In such a system, the nodes operate independently of each other and, further, the channels operate independently of each other and of the routing subsystems' internal logic. An additional source of randomness is present when each node in the system is self-timed. Although not illustrated, the steps of the routing controller and each channel are synchronized by the full/empty bit. The nodes will operate at different rates because of differences in the tasks being performed as well as variations in the electronics at each node. Because of the asynchrony of the overall system, these timing differences propagate, resulting in differences in when and how the routing subsystems perform various activities. These timing differences are in addition to the behavioral differences engendered by the dynamic characteristics of the local processing loads. The system asynchrony coupled with the node self-timing ensures that all of the routing subsystems operate independently of one another. This independent operation is important to assure that the adaptive routing choices distribute the routes well over all possibilities.

While preferred embodiments of the invention have been illustrated and described, it should be understood that variations apparent to those skilled in the art fall within the scope of the invention. For example, the operation of the router, which has been presented as a rigid sequential process, can be accomplished by alternative processes that realized the same principles. Such alternatives include replacing the controller with an alternative controller that processes multiple output frames at once.

Other variations falling within the scope of this invention are alternative schemes for processing of messages within a routing node. Such alternatives include the virtual cutthrough technique wherein the routing controller, when processing an output frame and after failing to find a profitable message in the less-than-full message queue, checks the input buffer for a message in any frame for which that output frame would be profitable, and finding one, moves the message from the input frame to the output frame without storing it in the message queue. It is also understood that even for message routing techniques that do not buffer messages within a node, the random selector can be applied to those messages awaiting the assignment of channels and that such random selection can provide probabilistic livelock freedom.

With respect to the random selector, it is understood that the messages subject to randomization by the selector need not be limited to those in the message queue, but can include messages waiting in the input buffer as well. Such an alternative can be useful for alternating routing schemes as mentioned in the previous paragraph.

The scope of this invention also includes random selector alternatives that do not treat all randomized messages with equal likelihood of selection. It is understood that different distributions are possible, including making more recently arrived messages more likely to be derouted, provided all messages considered for randomization have some nonzero likelihood of being selected.

In other alternative embodiments, the message injection rate may be controlled by limiting the frequency of injection. A counter may be set and then incremented each time a free output frame is identified. Once the counter reaches a predetermined number, the injection buffer is checked. In all other cycles, no injections are allowed. Alternatively, the system may allow message injection if, and only if, the message queue capacity is below some predetermined threshold.

With respect to the message injection scheme, in one alternative embodiment, the next node to receive the injection token is preassigned within the overall system. In this case, at step 74 of FIG. 4, the recipient of the tagged message m sends a null message to the sender of the tagged message and the sender regenerates the injection token. The advantage of assigning rather than computing neighbors is fault-tolerance. In the presence of one or more faulty nodes, a new Hamiltonian cycle can be computed that avoids the faulty nodes. In this case, a new assignment of neighbors can then take place.

The embodiments of the invention in which an exclusive property or privelege is claimed are defined as follows:

1. A message router system for routing messages from a source node to a destination node in a multinode processing system, the multinode processing system includes a multiplicity of nodes connected by channels such that a message may be routed along a profitable channel so that it is closer to its destination or derouted along a random channel so that it is further from its destination, wherein each node includes a routing subsystem having a set of input frames corresponding to the channels for receiving messages from the channels, a set of output frames corresponding to the channels for sending messages to the channels, and a fixed-size message queue for storing messages at the node, the message router system comprising at each node:
- (a) a routing controller for identifying an empty output frame, selecting a profitable message from the message queue such that the channel corresponding to said empty output frame is a profitable channel for said message, and, if said profitable message is available, writing said profitable message to said empty output frame; and
- (b) a random selector for randomly selecting a message to be derouted from said message queue if said routing controller does not identify a profitable message and if said message queue is full, and writing said derouted message to said empty output frame.

2. A message router system as claimed in claim 1, wherein said random selector selects a derouted message only if an input message is available at an input frame corresponding to said empty output frame.

3. A message router system as claimed in claim 1, wherein each node includes a main node processor and each routing subsystem includes an injection buffer and a destination buffer for communicating with said main node processor such that said main node processor reads and writes messages from said destination buffer and said injection buffer, respectively, and wherein said routing controller identifies a message destined for said node and writes said message to said destination buffer, and reads an injection message from said injection buffer and writes said injection message to said queue.

4. A message router system as claimed in claim 3, wherein said routing controller writes an injection message to said message queue only if said message queue is not full.

5. A message router system as claimed in claim 3, wherein an injection token is routed through said multinode processing system as a message, and wherein said routing controller upon receipt of said injection token writes an injection message to said message queue.

6. A message router system as claimed in claim 5, wherein said routing controller marks said injection message as a tagged message, such that when said tagged message is received at its destination the routing controller at said destination regenerates said injection token.

7. A message router system as claimed in claim 6, wherein said regenerated injection token is routed in a predetermined fashion such that each node in the multinode system receives said injection token once before any node receives said injection token twice.

8. A message router system as claimed in claim 1, wherein said multinode system is an asynchronous system and each of said nodes is self-timed.

9. A method for routing messages from a source node to a destination node in a multinode processing system, the multinode processing system including a multiplicity of nodes connected by channels such that a message may be routed along a profitable channel so that it is closer to its destination or derouted along a random channel so that it is further from its destination, wherein each node includes a routing subsystem having a set of input frames corresponding to the channels for receiving messages from the channels, a set of output frames corresponding to the channels for sending messages to the channels, and a fixed-size message queue for storing messages at the node, the method comprising the steps of:
- (a) identifying an empty output frame, selecting a profitable message from the message queue such that the channel corresponding to said empty output frame is a profitable channel for said message, and, if said profitable message is available, writing said profitable message to said empty output frame; and
- (b) if a profitable message cannot be identified and if said message queue is full, randomly selecting a message to be derouted from said message queue and writing said derouted message to said empty output frame.

* * * * *

UNITED STATES PATENT AND TRADEMARK OFFICE
CERTIFICATE OF CORRECTION

PATENT NO. : 5,151,900

DATED : September 29, 1992

INVENTOR(S) : Snyder et al.

It is certified that error appears in the above-identified patent and that said Letters Patent is hereby corrected as shown below:

| COLUMN | LINE | |
|---|---|---|
| 1 | 34 | "multiprocesor" should read --multiprocessor-- |
| 2 | 30 | "starbation" should read --starvation-- |
| 10 | 34 | "alternating" should read --alternative-- |
| 11 | 29-30 | "derouted message" should read --message to be derouted-- |

Signed and Sealed this

Fifth Day of October, 1993

Attest:

*Attesting Officer*

BRUCE LEHMAN

*Commissioner of Patents and Trademarks*